(12) United States Patent
Mazur

(10) Patent No.: US 10,448,067 B2
(45) Date of Patent: Oct. 15, 2019

(54) MEDIA CONTENT CROSS-REFERENCING

(71) Applicant: Disney Enterprises, Inc., Burbank, CA (US)

(72) Inventor: Jeffrey Mazur, West Hills, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/799,778

(22) Filed: Oct. 31, 2017

(65) Prior Publication Data
US 2019/0132619 A1 May 2, 2019

(51) Int. Cl.
*H04N 21/235* (2011.01)
*H04N 21/278* (2011.01)
*H04N 21/658* (2011.01)
*G06F 16/907* (2019.01)
*G06F 16/951* (2019.01)

(52) U.S. Cl.
CPC ....... *H04N 21/2353* (2013.01); *G06F 16/907* (2019.01); *G06F 16/951* (2019.01); *H04N 21/278* (2013.01); *H04N 21/6581* (2013.01)

(58) Field of Classification Search
CPC .............. H04N 21/278; H04N 21/6581; G06F 17/30864; G06F 17/30997
See application file for complete search history.

(56) References Cited

U.S. PATENT DOCUMENTS

| | | | | |
|---|---|---|---|---|
| 2006/0242259 | A1* | 10/2006 | Vallabh | H04N 7/17318 709/217 |
| 2014/0143068 | A1* | 5/2014 | Simonian | G06Q 30/0276 705/14.72 |
| 2015/0133049 | A1* | 5/2015 | Lee | H04W 4/60 455/41.1 |

* cited by examiner

*Primary Examiner* — Nasser M Goodarzi
*Assistant Examiner* — Adil Ocak
(74) *Attorney, Agent, or Firm* — Farjami & Farjami LLP

(57) ABSTRACT

A media content cross-referencing system includes a computing platform having a hardware processor and a system memory storing a media cross-referencing software code. The hardware processor executes the media cross-referencing software code to receive data identifying multiple media assets, identify a media content including the media assets based on the data, and obtain a preliminary version of the media content. The preliminary version of the media content includes metadata identifying an original source media of each of the media assets. The hardware processor further executes the media cross-referencing software code to map each of the media assets to its respective original source media using the metadata. The mapping cross-references each of the media assets with its respective original source media.

15 Claims, 8 Drawing Sheets

Request Raw

TITLE: BTR_106_CLIPPULL
FCM: NON-DROP FRAME
*FCM: DIGITAL TV 24P 001  992188    V    C    992188-BTR-106-RUF.MOV    01:18:41:05  01:18:41:17  00:00:00:00  00:00:00:12
* FROM CLIP NAME: 992188-BTR-106-RUF.MOV
* COMMENT:

002  992188    V    C    992188-BTR-106-RUF.MOV    01:28:48:01  01:28:49:03  00:00:00:12  00:00:01:14
* FROM CLIP NAME: 992188-BTR-106-RUF.MOV
* COMMENT:

003  992188    V    C    992188-BTR-106-RUF.MOV    01:18:06:14  01:18:06:22  00:00:01:14  00:00:01:22
* FROM CLIP NAME: 992188-BTR-106-RUF.MOV
* COMMENT:

004  992188    V    C    992188-BTR-106-RUF.MOV    01:18:09:12  01:18:09:21  00:00:01:22  00:00:02:07
* FROM CLIP NAME: 992188-BTR-106-RUF.MOV
* COMMENT:

005  992188    V    C    992188-BTR-106-RUF.MOV    01:18:07:11  01:18:07:23  00:00:02:07  00:00:02:19
* FROM CLIP NAME: 992188-BTR-106-RUF.MOV
* COMMENT:

006  992188    V    C    992188-BTR-106-RUF.MOV    01:09:03:13  01:09:04:00  00:00:02:19  00:00:03:06
* FROM CLIP NAME: 992188-BTR-106-RUF.MOV
* COMMENT:

Request EDL

| Edit# | Reel# | Channel | Trans | Duration | Src In | Src Out | Rec In | Rec Out | In | Out | Conf |
|---|---|---|---|---|---|---|---|---|---|---|---|
| 006 | 992188 | V | C | | 01:09:03:13 | 01:09:04:00 | 00:00:02:19 | 00:00:03:06 | 158 | 159 | 1 |
| 007 | 992188 | V | C | | 01:09:15:20 | 01:09:16:14 | 00:00:03:06 | 00:00:04:00 | 168 | 168 | 3 |
| 011 | 992188 | V | C | | 01:11:54:13 | 01:11:57:10 | 00:00:06:20 | 00:00:09:17 | 208 | 209 | 4 |
| 012 | 992188 | V | C | | 01:12:31:06 | 01:12:33:00 | 00:00:09:17 | 00:00:11:11 | 219 | 219 | 6 |
| 013 | 992188 | V | C | | 01:15:26:12 | 01:15:29:21 | 00:00:11:11 | 00:00:12:20 | 272 | 272 | 7 |
| 003 | 992188 | V | C | | 01:18:06:14 | 01:18:06:22 | 00:00:12:20 | 00:00:01:22 | 331 | 331 | 8 |
| 005 | 992188 | V | C | | 01:18:07:11 | 01:18:07:23 | 00:00:01:22 | 00:00:02:19 | 333 | 333 | 9 |
| 004 | 992188 | V | C | | 01:18:09:12 | 01:18:09:21 | 00:00:02:07 | 00:00:02:07 | 334 | 334 | 10 |
| 001 | 992188 | V | C | | 01:18:41:05 | 01:18:41:17 | 00:00:00:00 | 00:00:00:12 | 344 | 344 | 11 |
| 010 | 992188 | V | C | | 01:24:02:19 | 01:24:04:22 | 00:00:04:17 | 00:00:06:20 | 397 | 397 | 12 |
| 002 | 992188 | V | C | | 01:28:48:01 | 01:28:49:03 | 00:00:00:12 | 00:00:01:14 | 451 | 451 | 13 |
| 008 | 992188 | V | C | | 01:29:08:17 | 01:29:09:04 | 00:00:04:00 | 00:00:04:11 | 458 | 458 | 14 |
| 009 | 992188 | V | C | | 01:29:09:10 | 01:29:09:16 | 00:00:04:11 | 00:00:04:17 | 458 | 458 | 14 |

RoughOut EDL
469

| Edit# | Reel# | Channel | Trans | Duration | Src In | Src Out | Rec In | Rec Out |
|---|---|---|---|---|---|---|---|---|
| 158 | A215C003 | V | C | | 10:39:51:17 | 10:39:52:21 | 01:09:02:15 | 01:09:03:19 |
| 159 | B211C001 | V | C | | 10:26:39:17 | 10:26:40:18 | 01:09:03:19 | 01:09:04:20 |
| 160 | A215C002 | V | C | | 10:33:55:23 | 10:33:57:03 | 01:09:04:20 | 01:09:06:00 |
| 161 | B211C001 | V | C | | 10:27:50:17 | 10:27:52:04 | 01:09:06:00 | 01:09:07:11 |
| 162 | A215C003 | V | C | | 10:38:12:02 | 10:38:13:09 | 01:09:07:11 | 01:09:08:18 |
| 163 | B212C003 | V | C | | 10:56:16:22 | 10:56:18:00 | 01:09:08:18 | 01:09:09:20 |
| 164 | B212C001 | V | C | | 10:43:12:22 | 10:43:13:14 | 01:09:09:20 | 01:09:10:12 |
| 165 | B212C002 | V | C | | 10:53:01:05 | 10:53:01:19 | 01:09:10:12 | 01:09:11:02 |
| 166 | B212C003 | V | C | | 10:55:18:22 | 10:55:19:10 | 01:09:11:02 | 01:09:11:14 |
| 167 | B212C001 | V | C | | 10:43:34:10 | 10:43:35:05 | 01:09:11:14 | 01:09:12:09 |
| 168 | B211C002 | V | C | | 10:34:42:23 | 10:34:46:22 | 01:09:12:09 | 01:09:18:08 |
| 169 | SIGNATUR | V | C | | 01:00:02:10 | 01:00:04:10 | 01:09:18:08 | 01:09:20:08 |
| 170 | A273C004 | V | C | | 20:50:39:11 | 20:50:42:18 | 01:09:22:08 | 01:09:25:15 |

| | | | | | Conform EDL | | | |
|---|---|---|---|---|---|---|---|---|
| Edit# | Reel# | Channel | Trans | Duration | Src In | Src Out | Rec In | Rec Out |
| 001 | A215C003 | AA/V | C | | 10:39:49:17 | 10:39:54:21 | 01:00:00:00 | 01:00:05:04 |
| 002 | B211C001 | AA/V | C | 479 | 10:26:37:17 | 10:26:42:18 | 01:00:05:04 | 01:00:10:05 |
| 003 | B211C002 | AA/V | C | | 10:34:40:23 | 10:34:50:22 | 01:00:10:05 | 01:00:20:04 |
| 004 | B248C006 | AA/V | C | | 11:40:16:22 | 11:40:22:23 | 01:00:20:04 | 01:00:26:05 |
| 005 | B249C006 | AA/V | C | | 13:18:32:23 | 13:18:38:18 | 01:00:26:05 | 01:00:32:00 |
| 006 | B249C007 | AA/V | C | | 13:23:04:22 | 13:23:14:12 | 01:00:32:00 | 01:00:41:14 |
| 007 | B253C002 | AA/V | C | | 17:51:19:07 | 17:51:25:20 | 01:00:41:14 | 01:00:48:03 |
| 008 | A252C006 | AA/V | C | | 15:51:10:21 | 15:51:16:03 | 01:00:48:03 | 01:00:53:09 |
| 009 | B251C004 | AA/V | C | | 15:25:46:03 | 15:25:51:13 | 01:00:53:09 | 01:00:58:19 |
| 010 | A252C004 | AA/V | C | | 15:28:57:22 | 15:29:05:20 | 01:00:58:19 | 01:01:06:17 |
| 011 | C052C004 | AA/V | C | | 08:05:34:09 | 08:05:44:00 | 01:01:06:17 | 01:01:16:08 |

MEDIA CONTENT CROSS-REFERENCING

BACKGROUND

In order to make potential consumers aware of the future availability of media content presently in production, promotional segments of the media content, such as video clips of movie or television (TV) content for example, may be generated. When those promotional segments are generated, preliminary versions of the media content, such as rough cut or draft versions of TV content, for example, are often used to identify the particular shots or other media assets to include in the promotional segments.

However, the preliminary, or rough cut, versions of the media content used when identifying the media assets to be included in the promotional segments are typically below production quality, and may not be suitable for distribution to consumers. As a result, after a promotional segment has been approved, but before its distribution, higher quality versions of the media assets included in the promotional segment must be obtained from the original production camera footage. Moreover, shot markers, i.e., markups referencing a specific frame of the original camera footage, might also be added to the rough cut, but can lose their meaning in a final production version of the media content, which is often a modified version of the media content relative to the preliminary version. In the conventional art, the process of locating and extracting the media assets from a rough cut or carrying forward the markups into a final production version of media content based on identification of those media assets in a preliminary version of the media content is a manual process that may require hours of work by a human media manager.

SUMMARY

There are provided systems and methods for performing media content cross-referencing, substantially as shown in and/or described in connection with at least one of the figures, and as set forth more completely in the claims.

BRIEF DESCRIPTION OF THE DRAWINGS

FIG. 4B shows exemplary data identifying media assets, according to one implementation;

FIG. 4C shows an exemplary request edit decision list (EDL) file parsed from the data shown in FIG. 4B, according to one implementation, with one media asset highlighted;

FIG. 4D shows a mapping of the highlighted media asset identified in FIG. 4C to its original source media, according to one implementation; and FIG. 4E shows an exemplary use of the mapping of FIG. 4D for locating the media assets in their original source media.

DETAILED DESCRIPTION

Figure 1:
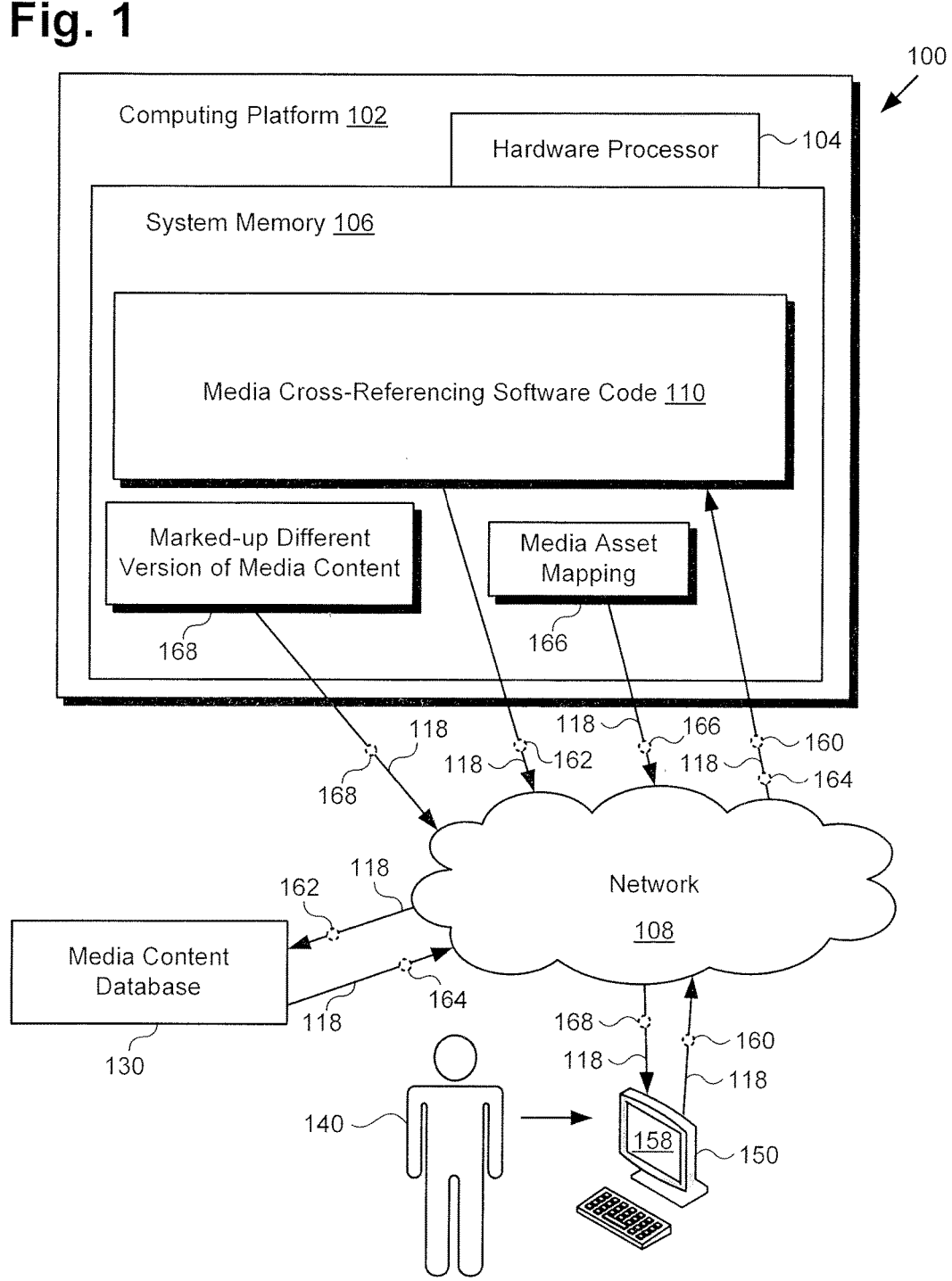
FIG. 1 shows a diagram of an exemplary media content cross-referencing system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, in order to make potential consumers aware of the future availability of media content presently in production, promotional segments of the media content, such as video clips of movie or television (TV) content for example, may be generated. When those promotional segments are generated, preliminary versions of the media content, such as rough cut or draft versions of TV content, for example, are often used to identify the particular shots or other media assets to include in the promotional segments.

However, and as also stated above, the preliminary, or rough cut, versions of the media content used when identifying the media assets to be included in the promotional segments are typically below production quality, and may not be suitable for distribution to consumers. As a result, after a promotional segment has been approved, but before its distribution, higher quality versions of the media assets included in the promotional segment must be obtained from the original camera footage. Moreover, shot markers, i.e., markups referencing a specific frame of the original camera footage, might also be added to the rough cut, but can lose their meaning in a final production version of the media content, which is often a modified version of the media content relative to the preliminary version. In the conventional art, the process of locating and extracting the media assets from a rough cut or carrying forward the markers markups into a final production version of media content based on identification of those media assets in a preliminary version of the media content may require hours of work by a human media manager.

The present application discloses systems and methods for performing media content cross-referencing that addresses and overcomes the deficiencies in the conventional art noted above. By mapping individual media assets to their respective original source media based on metadata included in a preliminary version of media content that includes the media assets, the present media cross-referencing solution automates a process for cross-referencing each media asset to its original source media. Moreover, the automated media cross-referencing solution disclosed in the present application can advantageously be performed in real-time, such as in seconds and in less than a minute. Additionally, the present application discloses an automated media cross-referencing solution that advantageously enables the location of media assets in substantially any different version of media content based on identification of those media assets in a preliminary version of the media content.

FIG. 1 shows a diagram of an exemplary media content cross-referencing system, according to one implementation. As shown in FIG. 1, media content cross-referencing system 100 includes computing platform 102 having hardware processor 104, and system memory 106 implemented as a non-transitory storage device. According to the present exemplary implementation, system memory 106 stores media cross-referencing software code 110, as well as media asset mapping 166 and marked-up different version 168 of media content produced using media cross-referencing software code 110.

As further shown in FIG. 1, media content cross-referencing system 100 is implemented within a use environment including communication network 108, user device 150 including display 158, and user 140 utilizing user device 150. In addition, FIG. 1 shows network communication links 118 interactively connecting user device 150 and media content database 130 with media content cross-referencing system 100 via communication network 108. Also shown in FIG. 1 are data 160, media content request 162, and media content 164.

It is noted that although FIG. 1 depicts media cross-referencing software code 110 as being stored in its entirety in system memory 106, that representation is merely provided as an aid to conceptual clarity. More generally, media content cross-referencing system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within media content cross-referencing system 100.

According to the implementation shown by FIG. 1, user 140 may utilize user device 150 to interact with media content cross-referencing system 100 over communication network 108. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network.

Although user device 150 is shown as a desktop computer in FIG. 1, that representation is also provided merely as an example. More generally, user device 150 may be any suitable mobile or stationary computing device or system that implements data processing capabilities sufficient to provide a user interface, support connections to communication network 108, and implement the functionality ascribed to user device 150 herein. For example, in other implementations, user device 150 may take the form of a laptop computer, tablet computer, or smartphone, for example. User 140 may utilize user device 150 to interact with media content cross-referencing system 100 to use media cross-referencing software code 110, executed by hardware processor 104, to produce media asset mapping 166 and marked-up different version 168 of media content 164.

For example, media asset mapping 166 may be produced by media content cross-referencing system 100 in an automated process in response to receiving data 160 from user device 150. Data 160 identifies multiple media assets associated with a media content, such as media content 164, as well media content 164 itself. Media content 164 may take a variety of forms. For instance, media content 164 may be audio-visual content, such as movie or TV news, sports, or dramatic programming content, music content, literary content, educational content, or programming code, to name a few examples.

The media assets identified by data 160 may also take a variety of forms corresponding to the nature of media content 164. For example, where media content 164 is music content, the media assets identified by data 160 may be individual music tracks, or samplings from such tracks. Alternatively, where media content 164 is literary content, the media assets identified by data 160 may be passages or brief quotations from that literary content.

As yet another alternative, where media content 164 is audio-visual content, the media assets identified by data 160 may be may be video clips or individual camera shots including portions of the audio-visual content. It is noted that, as used in the present application, a "camera shot" refers to a sequence of frames within audio-visual content that is captured from a unique camera perspective without cuts and/or other cinematic transitions. Thus, the media assets identified by data 160 may each include a single camera shot having multiple frames, or may include multiple camera shots, with each camera shot having multiple frames.

It is further noted that, in various implementations, media asset mapping 166 and/or marked-up different version 168 of media content 164, when produced using media cross-referencing software code 110, may be stored in system memory 106 and/or may be copied to non-volatile storage (not shown in FIG. 1). Alternatively, or in addition, as shown in FIG. 1, in some implementations, media asset mapping 166 and/or marked-up different version 168 of media content 164 may be transmitted to user device 150 including display 158, for example by being transferred via communication network 108. It is further noted that display 158 of user device 150 may take the form of a liquid crystal display (LCD), a light-emitting diode (LED) display, an organic light-emitting diode (OLED) display, or another suitable display screen that performs a physical transformation of signals to light.

Figure 2:
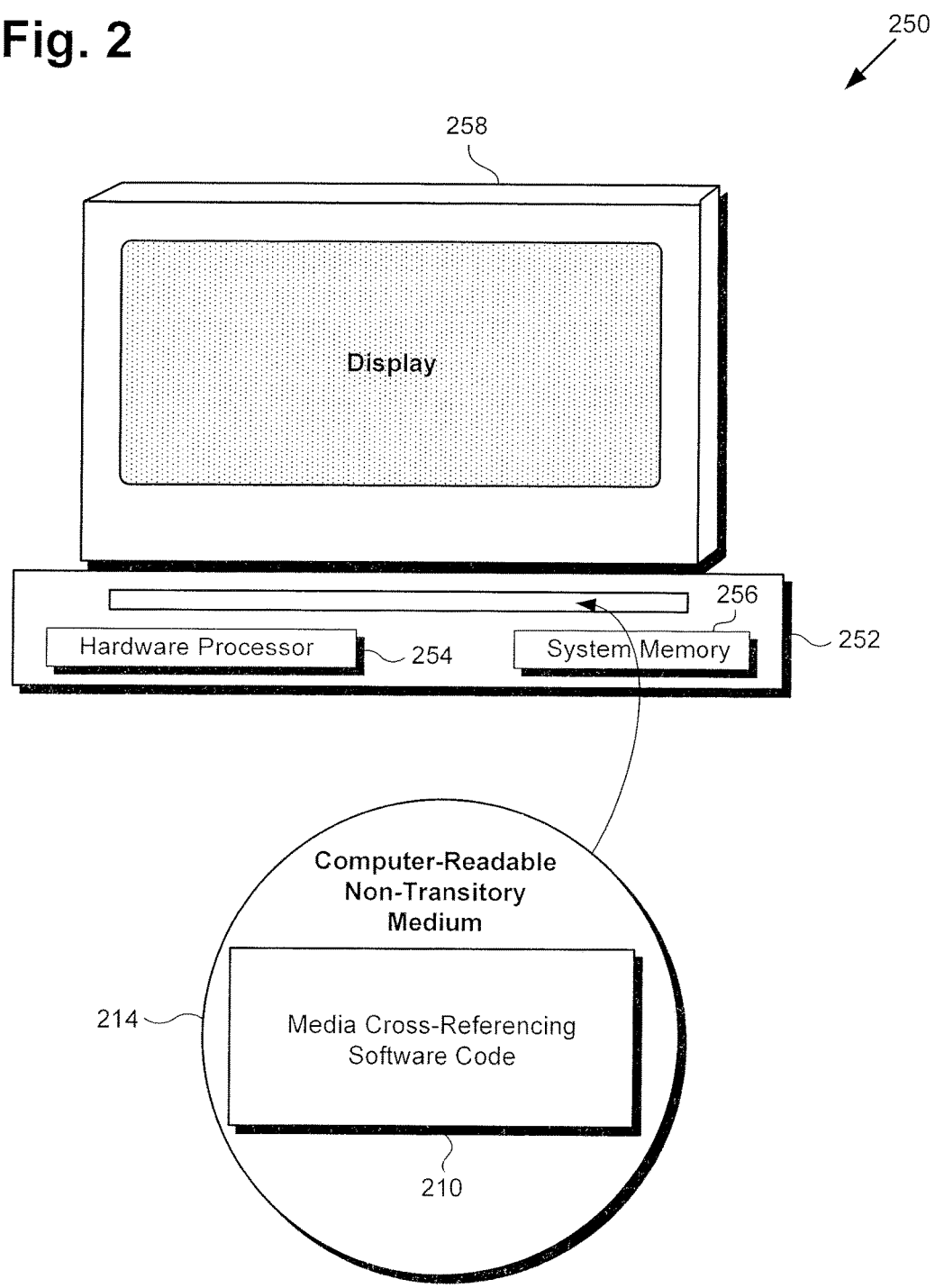
FIG. 2 shows an exemplary system and a computer-readable non-transitory medium including instructions for performing media content cross-referencing, according to one implementation.

FIG. 2 shows exemplary system 250 and computer-readable non-transitory medium 214 including instructions for performing media content cross-referencing, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to media content cross-referencing system 100 including computing platform 102 having hardware processor 104 and system memory 106, in FIG. 1. Consequently, system 250 may share any of the characteristics attributed to corresponding media content cross-referencing system 100 by the present disclosure.

Also shown in FIG. 2 is computer-readable non-transitory medium 214 having media cross-referencing software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides media cross-referencing software code 210 for execution by hardware processor 254 of computing platform 252. Media cross-referencing software code 210 corresponds in general to media cross-referencing software code 110, in FIG. 1, and is capable of performing all of the operations attributed to that corresponding feature by the present disclosure.

Figure 3:
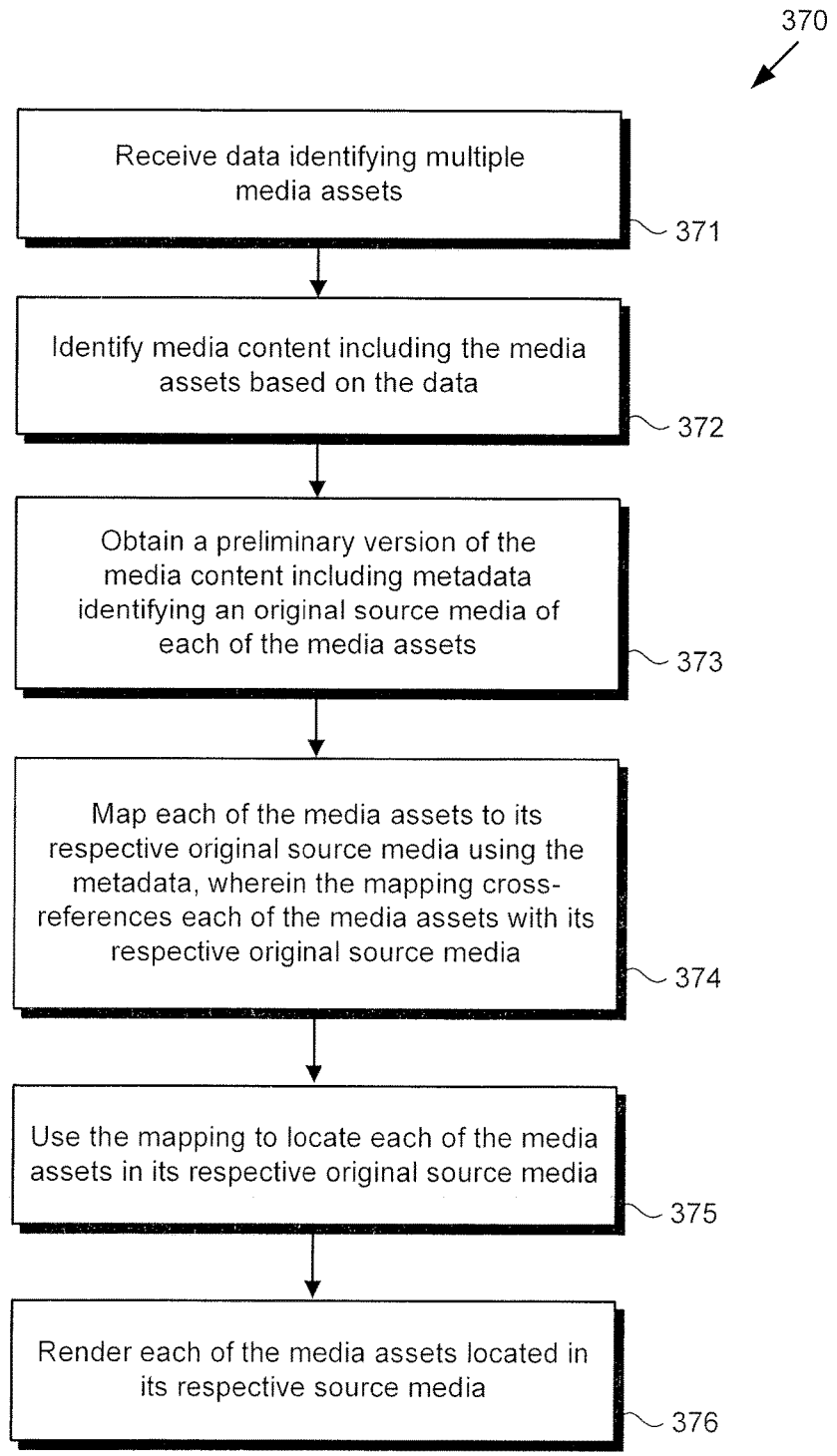
FIG. 3 shows a flowchart presenting an exemplary method for performing media content cross-referencing, according to one implementation.

The functionality of media cross-referencing software code 110/210 will be further described by reference to FIG. 3 in combination with FIGS. 4A, 4B 4C, 4D, and 4E (hereinafter "FIGS. 4A-4E"). FIG. 3 shows flowchart 370 presenting an exemplary method for use by a system, such as media content cross-referencing system 100, in FIG. 1, or system 250, in FIG. 2. With respect to the method outlined in FIG. 3, it is noted that certain details and features have been left out of flowchart 370 in order not to obscure the discussion of the inventive features in the present application.

Figure 4A:
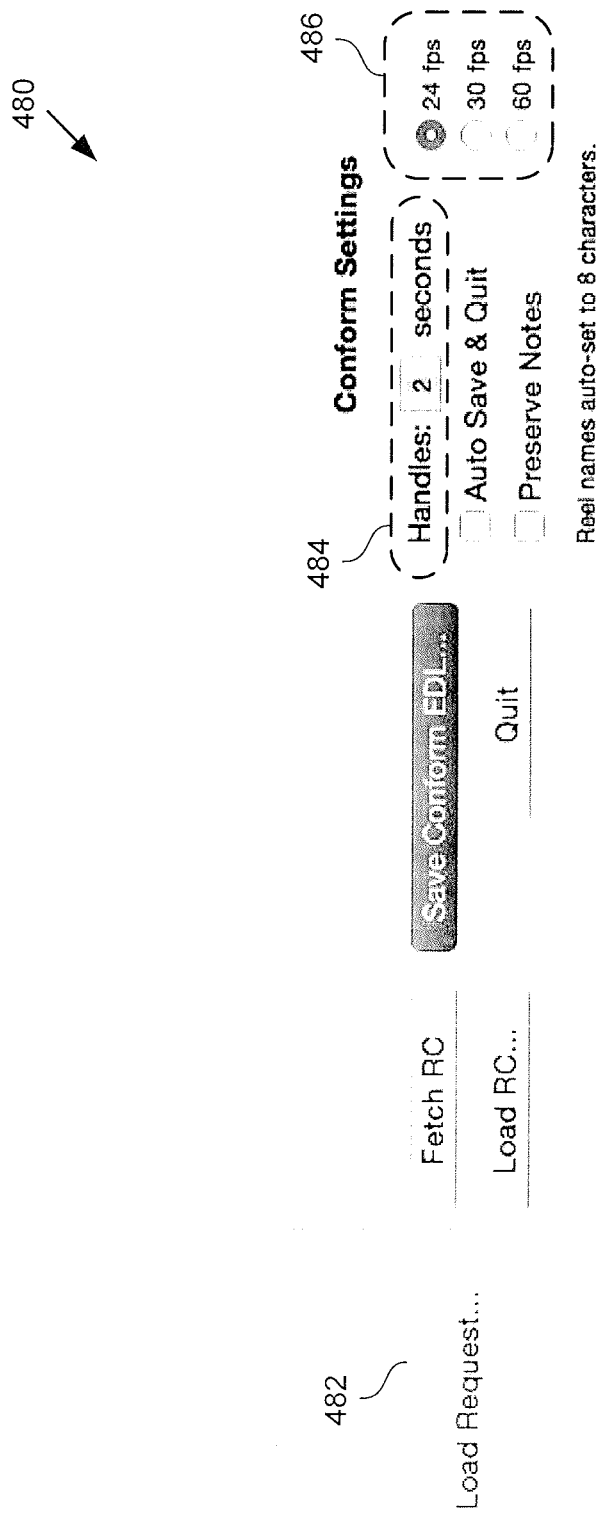
FIG. 4A shows an exemplary control window provided by a user interface of a media content cross-referencing system, according to one implementation.

FIG. 4A shows exemplary control window 480 provided by a user interface of media content cross-referencing system 100 or system 250, according to one implementation. FIG. 4B shows exemplary data 460 identifying media asset 461 according to one implementation. FIG. 4C shows exemplary request edit decision list (EDL) file 463 parsed from data 460 in FIG. 4B, according to one implementation. FIG. 4D shows media asset mapping 466 of the media assets including media asset 461 to their original source media, according to one implementation. FIG. 4E shows an exemplary use of mapping 466 for locating media asset 461 in the original source media content and the possibility to add extra footage, or handles (described below), to the original source to enhance the ability for an editor to adjust these shots.

It is noted that data 460 identifying media assets including media asset 461, and media asset mapping 466, correspond respectively in general to data 160, and media asset mapping 166, in FIG. 1, and those corresponding features may share any of the characteristics attributed to either corresponding features by the present disclosure.

Referring now to FIG. 3 in combination with FIGS. 1, 2, 4A, and 4B, flowchart 370 begins with receiving data 160/460 identifying media asset 461 (action 371). It is noted that although single representative media asset 461 is explicitly identified in the present figures in the interests of conceptual clarity, data 160/460 identifies multiple media assets corresponding to and including media asset 461 (hereinafter "the media assets including media asset 461").

By way of example, user 140 may utilize user device 150 to interact with media content cross-referencing system 100, or may interact directly with system 250, in order to produce media asset mapping 166/466. As shown by FIG. 1, in one implementation, user 140 may do so by transmitting data 160/460 identifying the media assets including media asset 461 from user device 150 to media content cross-referencing system 100 via communication network 108 and network communication links 118. Alternatively, data 160/460 identifying the media assets including media asset 461 may be received from a third party source of media content, or may be stored in system memory 106/256. Data 160/460 identifying the media assets including media asset 461 may be received by media cross-referencing software code 110/210, executed by hardware processor 104/254.

As shown in FIG. 4A, media cross-referencing software code 110/210, when executed by hardware processor 104/254, may provide control window 480 including request field 482 for receiving data 160/460. In addition, control window 480 enables user 140 to specify one or more parameters associated with the media assets identified by data 140/460. For example, and as further shown in FIG. 4A, control window 480 enables user 140 to specify handles 484 in seconds, as well as frame rate 486 of the media assets including media asset 461.

It is noted that although FIG. 4A depicts frame rate 486 as being manually selectable via control window 480, in some implementations, media cross-referencing software code 110/210 may automatically set frame rate 486. It is further noted that, as defined in the present application, "handles" refer to extensions applied to the beginnings and ends of timecode intervals identified by data 160/460. For example, specifying a timecode interval from 10 seconds to 20 seconds of a video segment having 2 second handles would result in pulling of a video clip extending from 8 seconds to 22 seconds.

As shown in FIG. 4B, data 160/460 identifying media assets including media asset 461 may include data 488 identifying media content 164 (e.g., by rough cut reel number or filename), as well as timecode range 490 locating media asset 461 in a preliminary version of media content 164. As noted above, media content 164 and the media assets including media asset 461 are generalized features corresponding to a wide variety of different types of media content and media assets. Nevertheless, in the interests of conceptual clarity, FIGS. 4A-4E correspond to an exemplary implementation in which media content 164 includes audio-visual content, and the media assets including media asset 461 include camera shots from that audio-visual content. Accordingly, and for exemplary purposes only, the description below will refer to media content 164 as if it is audio-visual content, and the media assets including media asset 461 as though they include camera shots from the audio-visual content.

Flowchart 370 continues with identifying media content 164 including media asset 461 based on data 160/460 (action 372). As noted above by reference to FIG. 4B, data 160/460 may include media content identification data 480 identifying media content 164. Identification of media content 164 including media asset 461 based on data 160/460 may be performed by media cross-referencing software code 110/210, executed by hardware processor 104/254, and using media content identification data 480.

Data 160/460 can by parsed by media cross-referencing software code 110/210, executed by hardware processor 104/254, to produce an EDL file based on data 160/460. FIG. 4C shows exemplary EDL file 463 parsed from data 160/460, and in which Edit #006 is highlighted.

Flowchart 370 continues obtaining a preliminary version of media content 164, the preliminary version of media content 164 including metadata identifying an original source media of each of each of the media assets including media asset 461 (action 373). The preliminary version of media content 164 may be obtained by media cross-referencing software code 110/210, executed by hardware processor 104/254.

The preliminary version of media content 164 may be obtained in a number of different ways. In one implementation, for example, as shown in FIG. 1, the preliminary version of media content 164 may be obtained from media content database 130, accessible to media content cross-referencing system 100 via communication network 108 and network communication links 118. For instance, in such an implementation, hardware processor 104/254 may execute media cross-referencing software code 110/210 to transmit media content request 162 identifying media content 164 to media content database 130, and to receive the preliminary version of media content 164 in response to the transmission of media content request 162.

Alternatively, in some implementations, the preliminary version of media content 164 may be obtained from user device 150 via communication network 108 and network communication links 118. In yet other implementations, the preliminary version of media content 164 may be stored in system memory 106/256. In those implementations, obtaining the preliminary version of media content 164 may be accomplished by a transfer of data within system memory 106/256.

It is noted that the preliminary version of media content 164 may be a rough cut or draft version of audio-visual content. That is to say, in implementations in which media content 164 includes audio-visual content, the preliminary version of media content 164 may be a low quality version of the audio-visual content including low resolution video, and/or video that has not been color corrected, and/or may include a burned-in timecode.

Flowchart 370 continues with mapping each of the media assets including media asset 461 to its respective original source media using metadata 467 and 469 (action 374). According to the present inventive principles, mapping of each of the media assets including media asset 461 to its respective original source media advantageously cross-references each of those media assets with their respective original source media. For example, according to the exemplary implementation shown by FIGS. 4B and 4D, video clip media asset 461 encompasses two camera shots from the original camera reels, i.e., A215C003 and B211C001, and the respective timecode ranges for those original camera reels included in mapping 466. Mapping of the media assets including media asset 461 to their respective original media sources so as to cross-reference each of those media assets with their respective sources may be performed by media cross-referencing software code 110/210, executed by hardware processor 104/254.

In implementations in which media content 164 includes audio-visual content and the media assets including media asset 461 take the form of camera shots, the original source media of each of the media assets including media asset 461 may include original camera footage of each of those media assets. Referring to FIG. 4D, media asset mapping 166/466 cross-references each of the media assets including media asset 461 to its respective original camera footage. For example, and as shown in FIG. 4D, media asset 461 is cross-referenced to its original source media by camera reel metadata 467 and timecode range metadata 469. As further shown by FIG. 4D, other media assets are analogously cross-referenced to their respective original source media by camera reel metadata 467 and timecode range metadata 469.

It is noted that the mapping of each of the media assets including media asset 461 to its respective original source media performed in action 374 can advantageously be performed in real-time, such as in a few or several seconds. In other words, action 374 can be performed in less than a minute.

In some implementations of the method outlined in FIG. 3, flowchart 370 continues with using media asset mapping 166/466 to locate each of the media assets including media asset 461 in its respective original source media (action 375). For example, the cross-referencing of media asset 461 to its original source media in the preliminary version of media content 164 achieved by media asset mapping 166/466 can enable locating media asset 461 in that original source media. Use of media asset mapping 166/466 to locate each of the media assets including media asset 461 in its respective original source media may be performed by media cross-referencing software code 110/210, executed by hardware processor 104/254.

FIG. 4E shows an exemplary use of mapping 466 for locating media asset 461 from the original camera footage. FIG. 4E shows a portion of conform EDL file 478 including located media asset 461. As noted above, according to the exemplary implementation shown by FIGS. 4A-4E video clip media asset 461 encompasses two camera shots from the original camera reels A215C003 and B211C001, and the respective timecode ranges for those original camera reels included in mapping 466. Those two camera shots appear as the first two highlighted lines of conform EDL file 478 identifying the original source media, e.g., reel 477, and timecode range 479 enabling location of the first camera shot of media asset 461 in the original footage. It is noted that timecode range 479 is extended by 4 seconds relative to the corresponding timecode range shown by metadata 469 to include the 2 second handles 484 requested by user 140 via control window 480.

In some implementations, flowchart 370 can conclude with rendering each of the media assets including media asset 461 from its respective original source media (action 376). For example, and as noted above, where the preliminary version of media content 164 is a rough cut low quality version of audio-visual content, the original source media in which the media including media asset 461 are located in action 375 may be high quality audio-visual content. In those implementations, action 376 corresponds to rendering the media assets including media asset 461 extracted from the high quality original source media content.

For instance, where the media assets including media asset 461 include camera shots from audio-visual content 164, rendering the media assets including media asset 461 may correspond to rendering a video clip including those media assets (camera shots) located in the original camera footage of audio-visual content 164. In some implementations, rendering the media assets including media asset 461 may include rendering those media assets on a display, such as display 258 of system 250. Rendering of the media assets including media asset 461 may be performed by media cross-referencing software code 110/210, executed by hardware processor 104/254.

Although not included in the exemplary outline provided by flowchart 370, in some implementations, the preliminary version of media content 164 may include multiple markups, such as shot markers, for example, indexed to the timecode of the preliminary version of media content 164. In those implementations, hardware processor 104/254 may execute media cross-referencing software code 110/210 to obtain a copy of a different version, for example, a final production version of media content 164, and to map at least some of the markups indexed to the timecode of the preliminary version of media content 164 to a timecode of the different version of media content 164.

The mapping of the markups from the preliminary version of media content 164 to a different version of media content 164 may be performed in a manner analogous to the mapping of media asset 461 described above. Moreover, in those implementations, hardware processor 104/254 may also execute media cross-referencing software code 110/210 to modify the copy of the different version of media content 164 to include the markups mapped from the preliminary version of media content 164, resulting in marked-up different version 168 of media content 164.

It is noted that the mapping of the markups from the preliminary version of media content 164 to the different version of media content 164 can advantageously be performed in real-time, such as in a few or several seconds. That is to say, the mapping of the markups that results in generation of marked-up different version 168 of media content 164 can be performed in less than a minute.

Thus, the present application discloses systems and methods for performing media content cross-referencing. By mapping individual media assets to their respective original source media based on metadata included in a preliminary version of media content that includes the media assets, the present media cross-referencing solution automates a process for cross-referencing each media asset to its original source media. Moreover, the automated media cross-referencing solution disclosed in the present application can advantageously be performed in real-time, such as in seconds and in less than a minute. As a result, the present application discloses an automated media cross-referencing solution that advantageously enables the location of media assets in substantially any modified version of media content based on identification of those media assets in a preliminary version of the media content.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media content cross-referencing system comprising:
   a computing platform including a hardware processor and a system memory;
   a media cross-referencing software code stored in the system memory;
   the hardware processor configured to execute the media cross-referencing software code to:
   receive data identifying a plurality of media assets;
   identify a media content including the plurality of media assets based on the data;
   obtain a first version of the identified media content, the first version of the identified media content including metadata identifying the plurality of media assets in a second version of the identified media content, the metadata having camera reel metadata and timecode range metadata, wherein the plurality of media assets in the first version have a lower quality than the plurality of media assets in the second version;
   map each of the plurality of media assets in the first version to its corresponding one of the plurality of media assets in the second version using the camera reel metadata and the timecode range metadata, wherein the mapping cross-references each of the plurality of media assets in the first version to its corresponding one of the plurality of media assets in the second version; and
   locate, based on the mapping, each of the plurality of media assets in the second version of the identified media content.

2. The media content cross-referencing system of claim 1, wherein the hardware processor is further configured to execute the media cross-referencing software code to render each of the plurality of media assets located in the second version of the identified media content.

3. The media content cross-referencing system of claim 1, wherein the identified media content comprises audio-visual content.

4. The media content cross-referencing system of claim 3, wherein the plurality of media assets comprise camera shots included in the audio-visual content.

5. The media content cross-referencing system of claim 3, wherein the first version of the identified media content is a rough cut low quality version of the audio-visual content.

6. The media content cross-referencing system of claim 3, wherein the second version of the identified media content comprises original camera footage of each of the plurality of media assets.

7. The media content cross-referencing system of claim 6, wherein the hardware processor is further configured to execute the media cross-referencing software code to render a video clip including each of the plurality of media assets located in the second version of the identified media content.

8. A method for use by a media content cross-referencing system including a computing platform having a hardware processor and a system memory storing a media cross-referencing software code, the method comprising:
   receiving, using the hardware processor, data identifying a plurality of media assets;
   identifying, using the hardware processor, a media content including the plurality of media assets based on the data;
   obtaining, using the hardware processor, a first version of the identified media content, the first version of the identified media content including metadata identifying the plurality of media assets in a second version of the identified media content, the metadata having camera reel metadata and timecode range metadata, wherein the plurality of media assets in the first version have a lower quality than the plurality of media assets in the second version;
   mapping, using the hardware processor, each of the plurality of media assets in the first version to its corresponding one of the plurality of media assets in the second version using the camera reel metadata and the timecode range metadata, wherein the mapping cross-references each of the plurality of media assets in the first version to its corresponding one of the plurality of media assets in the second version; and
   locating, based on the mapping, each of the plurality of media assets in the second version of the identified media content.

9. The method of claim 8, further comprising rendering, using the hardware processor, each of the plurality of media assets located in the second version of the identified media content.

10. The method of claim 8, wherein the identified media content comprises audio-visual content.

11. The method of claim 10, wherein the plurality of media assets comprise camera shots included in the audio-visual content.

12. The method of claim 10, wherein the first version of the identified media content is a rough cut low quality version of the audio-visual content.

13. The method of claim 10, wherein the second version of the identified media content comprises original camera footage of each of the plurality of media assets.

14. The method of claim 13, further comprising rendering, using the hardware processor, a video clip including each of the plurality of media assets located in the second version of the identified media content.

15. The method of claim 8, wherein the first version of the identified media content includes a plurality of markups indexed to a timecode of the first version of the identified media content, and wherein the method further comprises:
 obtaining, using the hardware processor, a copy of the second version of the identified media content;
 mapping, using the hardware processor, at least some of the plurality of markups indexed to the timecode of the first version of the identified media content to a timecode of the second version of the identified media content; and
 modifying, using the hardware processor, the copy of the second version of the identified media content to include the at least some of the plurality of markups.

* * * * *